United States Patent Office 2,744,831
Patented May 8, 1956

2,744,831

INHIBITING ALKALI REACTIVITY OF PORTLAND CEMENT

Walter J. McCoy, Catasauqua, Pa., assignor to Lehigh Portland Cement Company, Allentown, Pa., a corporation of Pennsylvania No Drawing. Application May 7, 1951,
Serial No. 225,057

11 Claims. (Cl. 106—98)

This invention relates generally to Portland cement and more particularly to inhibiting the so-called alkali-aggregate reaction in concrete containing a reactive aggregate.

It has for some time been recognized that there is an undesirable reaction in concrete between the alkalies in Portland cement and certain siliceous aggregates when this type of aggregate is used in the concrete mix. In some localities concrete failures have been traced to a reaction between alkalies in the cement and the aggregates used in those localities. It was determined that these aggregates contained amorphous silica and tests of concrete made with these aggregates and cement containing more than 0.6% of alkalies showed the concrete to have expanded excessively due to an unwanted reaction between the aggregate and the alkalies of the cement.

Investigators have expressed the view that the concrete deterioration arises from osmotic imbibition of water by alkalic silica gels which have been formed through interaction between the aggregate and the alkalies liberated by the high-alkali cement during hydration. These osmotic pressures frequently exceed the tensile strength of the concrete and cause the formation of fractures which probably are sufficiently extensive to account for the increase in volume and decline in strength.

In any event, the alkali-aggregate reaction may (and frequently does) with the passage of time result in ultimate disintegration or failure of the concrete structure. Manifestly the excessive expansion associated with the alkali-aggregate reaction is unwanted and methods have been suggested to avoid it and its undesirable consequences. Heretofore, two methods have been suggested to overcome the difficulty.

One of the methods for avoiding the unwanted alkali-aggregate reaction is to manufacture the cement with a low alkali content. The exact limits of the amount of alkali permissible in a cement to avoid the unwanted alkali-aggregate reaction is not certain but danger of the reaction exists if the alkalies in the cement exceed 0.6%. The objection to this method of controlling the reaction is that alkalies are naturally occurring constituents of the raw materials used in making Portland cements and their removal is not economically feasible.

The other method which has been used to inhibit or limit the alkali-aggregate reaction and the one which has been commonly practiced involves the addition to the concrete mix of large quantities of pozzolanic material such as certain kinds of calcined shales. The amount of pozzolanic material required is large—usually 20% to 30% of the weight of the cement being used.

The method of inhibiting the alkali-aggregate reactivity in concrete according to this invention is fundamentally distinct from those previously employed. The invention makes it possible to manufacture a cement containing such quantities of alkalies as would normally be present and notwithstanding the presence of alkalies in an amount which would normally cause a deleterious reaction if the cement is used with a siliceous aggregate, the unwanted reaction can be inhibited and without the necessity of adding large quantities of pozzolanic material as has heretofore been done.

To accomplish this desirable end, according to the invention, there is incorporated in the concrete mix relatively very small amounts of agents (herein referred to as "inhibitors") which inhibit the unwanted alkali-aggregate reaction, as evidenced by a reduction in expansion. The inhibitor may in some instances be incorporated during the cement manufacturing process, or it may be added to the cement after the cement is manufactured in the customary way or it may be added at the time the concrete is mixed. Preferably it is incorporated in the cement so that the cement may be used in the normal way.

Among the agents which have been found to be effective in inhibiting the alkali-aggregate reaction, as evidenced by a reduction in expansion, are the compounds of lithium in the form of salts. Lithium is one of the alkali metals but differs from sodium and potassium in several respects. It differs from other metals forming insoluble silicates in not being precipitated as a hydroxide by the hydration products of Portland cement. Unlike other materials such as acids which prevent the solution of silica by alkalies, lithium salts such as lithium carbonate do not materially interfere in the normal hydration and setting of the cement. Copper compounds such as copper sulphate and copper oleate are other examples of materials which have been found to be effective in inhibiting the expansion of concrete caused by the alkali-aggregate reaction.

Relatively very small quantities of the inhibitor incorporated in the cement (or, if desired, in the concrete mix) is sufficient to cause the desired inhibiting effect. Amounts of the order of 0.5% based on the weight of the cement are ordinarily enough but in any case an amount of inhibitor not exceeding the order of 1% is sufficient.

The test which is recommended by the specification of the United States Bureau of Reclamation for determining potential alkali reactivity of cement in cement-aggregate combinations consists, briefly stated, of measuring the expansion of speciments made up of the cement and Pyrex glass and then testing under standard conditions after being stored in a moist atmosphere at 100° F. The purpose of the use of Pyrex glass (an unusually reactive aggregate) and the specified storage conditions is to accelerate the reaction so that its potential effects may be measured within a reasonable period of time.

To establish that the addition of small amounts of inhibitors to Portland cement is effective to inhibit the potential reactivity of cement-aggregate combinations, a series of tests were carried out in accordance with the standard recommended tests, as follows: Mortars were prepared in the proportion of 1 part of cement to 2.25 parts by weight of Pyrex glass graded from 149 to 4760 microns. Water was added in the quantity of 50% of the weight of cement. After mixing, the mortar was formed in 1" x 1" x 10" bars in standard molds following the standard specifications. After setting 24 hours the bars were removed from the molds, their lengths measured, and they were then placed in sealed containers in which the specimens were suspended on racks over water. The containers were then store at a temperature of 100° F. for two weeks. The bars were then removed from the containers and again measured in accordance with the standards of the test specifications.

The cement (herein called cement A) used in these tests was of a high alkali content and of known reactive properties so that it was assured that the expansion obtained in the tests was of a magnitude typical of cements which, without steps taken to inhibit it, would react with siliceous aggregate to an unwanted and undesirable extent. That is, the potential alkali reactivity of the cement in cement-aggregate combinations using that cement and a siliceous aggregate without some means provided for inhibiting the reaction, would not favorably meet the specifications.

Experience has shown that in such tests if the expansion of the magnitude exhibited by an untreated test bar can be reduced at least 60% to 75% in bars under these test conditions, the cement containing the inhibitors can safely be used with reactive siliceous aggregates.

Table I below sets forth the result of a series of tests with cement A which contained 1.15% of alkalies expressed as $Na_2O$. The cement is the same in all cases except an inhibitor in the amount and kind specified in the table was incorporated in the cement, the percentage being by weight based on the weight of the cement. The first column shows the kind and amount of inhibitor added; the second column shows the percent expansion, measured as above mentioned, and the third column shows the percent reduction in expansion of the bars taking as the standard the expansion of the bar made from cement A containing no inhibitor.

Table I

| Inhibitor | Percent Expansion | Percent Expansion Reduction |
|---|---|---|
| (1) None | .245 | |
| (2) 0.5% Lithium Chloride | .061 | 75 |
| (3) 1.0% Lithium Chloride | .024 | 90 |
| (4) 0.5% Lithium Carbonate | .027 | 89 |
| (5) 1.0% Lithium Carbonate | .015 | 94 |
| (6) 0.5% Lithium Fluoride | .020 | 92 |
| (7) 1.0% Lithium Fluoride | .007 | 97 |
| (8) 1.0% Lithium Silicate | .029 | 88 |
| (9) 1.0% Lithium Nitrate | .047 | 81 |
| (10) 1.0% Lithium Sulphate | .029 | 88 |
| (11) 1.0% Copper Sulphate | .069 | 72 |
| (12) 1.0% Copper Oleate | .094 | 61 |

The expansion of the untreated cement A (Bar No. 1) was sufficient to indicate that if the cement were to be used with a reactive aggregate, a disruptive expansion reaction would ultimately result. An examination of the data shows that when the inhibitor is added to the cement in an amount of the order of 1% or less, a substantial reduction in expansion, well within the permissible test limits, is produced. While the lithium salts appear to be the most effective, they are not necessarily the only materials which may be successfully employed, it being noted that copper sulphate incorporated in the amount of 1.0% showed a reduction in expansion of 72% and 1.0% of copper oleate shows a reduction of 61%.

In another series of tests a small amount of inhibitor of the kind herein mentioned was added to a cement (herein called cement B) which contained a smaller amount of alkalies than cement A. Cement B contained 0.5% alkali expressed as $Na_2O$. In tests conducted in the same manner as those tabulated in Table I, the significant results using cement B are shown in Table II; the first column showing the inhibitor, and the second column the percent expansion.

Table II

| Inhibitor | Percent Expansion |
|---|---|
| (a) None | .096 |
| (b) 0.75% Lithium Carbonate | .009 |

A comparison of the results shown in Tables I and II shows that the expansion of the high alkali cement when inhibitors are added according to the invention was even less than the expansion of a lower alkali cement. It is also apparent that the lower alkali cement B was improved by incorporating a small amount of inhibitor.

The terms and expressions which have been employed herein are used as terms of description and not of limitation, and there is no intention in the use of such terms and expressions of excluding any equivalent of the features shown and described or portions thereof, but it is recognized that various modifications are possible within the scope of invention claimed.

What is claimed is:

1. In the art of making concrete structures wherein Portland cement containing alkali and a reactive siliceous aggregate are intermixed with water to form a concrete mix and the thus formed concrete mix is permitted to set, the method of inhibiting unwanted expansion of the concrete after the concrete has set which comprises incorporating into the concrete mix prior to the setting of the concrete a small quantity of a salt selected from the group of salts consisting of chloride, carbonate, fluoride, silicate, nitrate, and sulphate, of lithium, and sulphate and oleate of copper, in an amount not exceeding about 1% by weight of the cement but sufficient to inhibit unwanted chemical reaction of the alkali in the cement with the siliceous aggregate, after the concrete has set, thereby inhibiting unwanted expansion in the concrete after it has set.

2. In the art of making concrete structures wherein Portland cement containing alkali and a reactive siliceous aggregate are intermixed with water to form a concrete mix and the thus formed concrete mix is permitted to set, the method of inhibiting unwanted expansion of the concrete after the concrete has set which comprises incorporating into the concrete mix an inorganic water soluble lithium salt in an amount not substantially exceeding 1% but sufficient to inhibit chemical reaction of the alkali in the cement with the siliceous aggregate after the concrete has set thereby inhibiting unwanted expansion in the concrete after it has set.

3. In the art of making concrete structures wherein Portland cement containing alkali and a reactive siliceous aggregate are intermixed with water to form a concrete mix and the thus formed concrete mix is permitted to set, the method of inhibiting unwanted expansion of the concrete after the concrete has set which comprises incorporating lithium silicate into the concrete mix in an amount not exceeding about 1% by weight of the cement but sufficient to inhibit chemical reaction of the alkali in the cement with the siliceous aggregate after the concrete has set thereby inhibiting unwanted expansion in the concrete after it has set.

4. In the art of making concrete structures wherein Portland cement containing alkali and a reactive siliceous aggregate are intermixed with water to form a concrete mix and the thus formed concrete mix is permitted to set, the method of inhibiting unwanted expansion of the concrete after the concrete has set which comprises incorporating into the concrete mix a small quantity of lithium carbonate in an amount not substantially exceeding 1% by weight of the cement but sufficient to inhibit chemical reaction of the alkali in the cement with the siliceous aggregate after the concrete has set thereby inhibiting unwanted expansion in the concrete after it has set.

5. A composition adapted for use in making a concrete mix in which the aggregate used in the mix is siliceous which composition comprises a combination in dry form of Portland cement containing reactive alkali and a small amount of a water soluble inorganic lithium salt the lithium salt being present in said composition in an amount not substantially exceeding 1% but sufficient to inhibit chemical reaction of the alkali in the cement with the siliceous aggregate in the concrete after it has set when said composition is used with a siliceous aggregate to form said concrete.

6. A composition adapted for use in making a concrete mix in which the aggregate used in the mix is siliceous which composition comprises a combination in dry form of Portland cement containing reactive alkali and a small amount of a lithum silicate the lithium silicate being present in said composition in an amount not substantially exceeding 1% based on the weight of the cement but sufficient to inhibit chemical reaction of the alkali in the cement with the siliceous aggregate in the concrete after it has set when said composition is used with a siliceous aggregate to form said concrete.

7. A composition adapted for use in making a concrete mix in which the aggregate used in the mix is siliceous which composition comprises a combination in dry form of Portland cement containing reactive alkali and a small amount of a lithium carbonate, the lithium carbonate being present in said composition in an amount not substantially greater than 1% but sufficient to inhibit chemical reaction of the alkali in the cement with the siliceous aggregate in the concrete after it has set when said composition is used with a siliceous aggregate to form said concrete.

8. A composition adapted for use in making a concrete mix in which the aggregate used in the mix is siliceous which composition comprises a combination in dry form of Portland cement containing reactive alkali and a small amount of a lithium chloride, the lithium chloride being present in said composition in an amount not substantially exceeding 1% but sufficient to inhibit chemical reaction of the alkali in the cement with the siliceous aggregate in the concrete after it has set when said composition is used with a siliceous aggregate to form said concrete.

9. A concrete structure made from a concrete mix containing an intimately intermixed Portland cement containing reactive alkali, a siliceous aggregate and a water soluble inorganic lithium salt said lithium salt being incorporated with the cement in an amount not substantially exceeding 1% based on the weight of the cement and serving after the concrete has set to inhibit reaction between the alkali in the cement and the siliceous aggregate.

10. A concrete structure made from a concrete mix containing an intimately intermixed Portland cement containing reactive alkali, a siliceous aggregate and lithium carbonate, said lithium carbonate being incorporated with the cement in an amount not exceeding about 1% based on the weight of the cement and serving after the concrete has set to inhibit reaction betwee nthe alkali in the cement and the siliceous aggregate.

11. In the art of making concrete structures wherein a reactive siliceous aggregate is intermixed with water and a Portland cement, containing alkali which would normally cause a deleterious alkali-aggregate reaction, to form a concrete mix and the thus formed concrete mix is permitted to set, the method of inhibiting unwanted expansion of the concrete after the concrete has set which method comprises incorporating into the concrete mix a small quantity of an alkali-aggregate reaction inhibitor agent consisting essentially of at least one water soluble inorganic salt of lithium, the amount of said inhibitor agent incorporated in said concrete mix being about .5% to 1% by weight of the cement thereby inhibiting the chemical reaction between said alkali and the reactive siliceous aggregate so as to avoid subsequent expansion of the concrete.

References Cited in the file of this patent

UNITED STATES PATENTS

| | | |
|---|---|---|
| 1,048,695 | Horn | Dec. 31, 1912 |
| 1,140,124 | Dalen | May 18, 1915 |
| 1,269,695 | Fairfax | June 18, 1918 |
| 1,318,313 | Coleman | Oct. 7, 1919 |
| 2,071,681 | Brownmiller | Feb. 23, 1937 |
| 2,228,539 | Stark | Jan. 14, 1941 |
| 2,233,973 | Dunn | Mar. 4, 1941 |
| 2,307,270 | Hodge | Jan. 5, 1943 |
| 2,360,517 | Scripture | Oct. 17, 1944 |
| 2,439,650 | Cuno | Apr. 13, 1948 |
| 2,469,356 | Hammond | May 10, 1949 |

OTHER REFERENCES

McCoy, W. J., and Caldwell, A. G.: "New Approach to Inhibiting Alkali-Aggregate Expansion," vol. 47, Journal of the American Concrete Institute, pages 693–706.